No. 656,083. Patented Aug. 14, 1900.
J. A. BERGER.
PUNCTURE PROOF PNEUMATIC TIRE.
(Application filed Jan. 22, 1900.)
(No Model.)
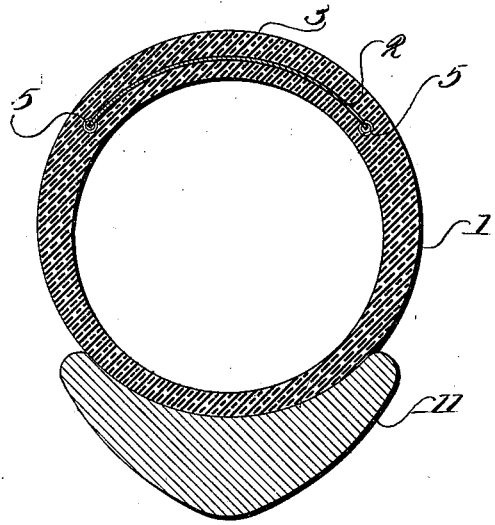
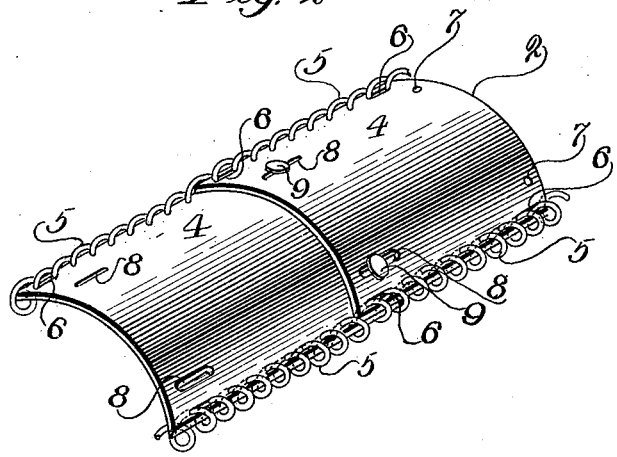
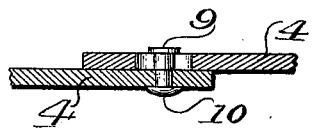
Witnesses
H. S. Gaither.
Glen C. Stephens.
Inventor
Joseph A. Berger
By H. R. Rummler
his Atty

UNITED STATES PATENT OFFICE.

JOSEPH A. BERGER, OF CHICAGO, ILLINOIS.

PUNCTURE-PROOF PNEUMATIC TIRE.

SPECIFICATION forming part of Letters Patent No. 656,083, dated August 14, 1900.

Application filed January 22, 1900. Serial No. 2,278. (No model.)

*To all whom it may concern:*

Be it known that I, JOSEPH A. BERGER, a citizen of the United States of America, and a resident of Chicago, in the county of Cook and State of Illinois, have invented certain new and useful Improvements in Puncture-Proof Pneumatic Tires, of which the following is a specification.

My invention relates to pneumatic tires in which a metallic band or armor is seated in the material of the tire to protect same against puncture.

The main object of my invention is to prevent the material of the tire from being cut or torn by the edges of said band or armor.

A further object is to provide an improved form of armor-plates. I accomplish these objects by the device shown in the accompanying drawings, in which—

Figure 1 is a cross-section of the pneumatic tire constructed according to my invention. Fig. 2 is a perspective view of two armor-plates for forming the metallic band which surrounds the tire near its tread. Fig. 3 is a longitudinal section taken through two of the plates, partly broken away.

The tire 1 has the band 2 seated therein and extending entirely around the tire near the tread 3. Said band is preferably made of a series of armor-plates 4, which have a limited sliding connection to each other. Each edge of the band is perforated and the coil-spring 5 passes through said perforations and over the adjoining edge. In the form shown each plate is provided with slots 6 in line with said perforations. Said slots prevent the coil-spring from interfering with the sliding connection of the plates. Each plate has the perforations 7 near one end and the oblong slots 8 near the other end. The studs 9 have their heads of greater diameter than the slots 8. When the plates are placed in proper relative position for fastening same together, the lower end of the studs 9 will be passed through the perforations 7 and spun under same at 10, to form a rivet, as shown in Fig. 3.

11 denotes the wheel-rim.

It will be understood that the protecting band or armor-plates will be made of thin spring-steel or similar tough and resilient material.

The operation of my device is as follows: When any pressure is brought to bear upon the tire, the coil-spring 5 will not interfere with the resilience of the protecting-band 2. Said spring will be embedded in the material of the tire and will prevent the edges of the band 2 from cutting into said material. The connection between the plates at the studs 9 will aid in rendering the band 2 resilient, since same will permit a slight sliding movement of the overlapping parts of said plates. It will be understood that if said plates were not slotted at 6, but merely perforated, as in other parts, for receiving the spring, the sliding movement of said plates would be interfered with, the slots 6 permitting said sliding movement against the action of the springs 5.

It will be understood that minor details of my device, such as the form of the band 2, may be altered without departing from the spirit of my invention. I therefore do not confine myself to the details of construction, except as hereinafter limited in the claims.

What I claim as my invention, and desire to secure by Letters Patent, is—

1. In a pneumatic tire, a resilient metallic band seated in the material of the tire near the tread, and having a coil-spring secured to and along each edge of said band for the purpose specified.

2. In a pneumatic tire, a resilient metallic band seated in the material of the tire near the tread, and having a series of perforations along each edge, and a coil-spring extending through said perforations and over the adjoining edge, substantially as and for the purpose specified.

3. In a pneumatic tire, an armor-band, comprising a series of plates slidingly connected together, having a series of perforations along their side edges, and elongated slots toward each end, and a coil-spring extending through said perforations and slots, and over the edges of said plates, substantially as and for the purpose specified.

4. In a pneumatic tire, an armor-plate seated in the material of the tire and having a coil-spring secured to and along its edge for the purpose specified.

Signed by me at Chicago, Illinois, this 19th day of January, 1900.

JOSEPH A. BERGER.

Witnesses:
WM. R. RUMMLER,
GLEN C. STEPHENS.